Patented May 15, 1945

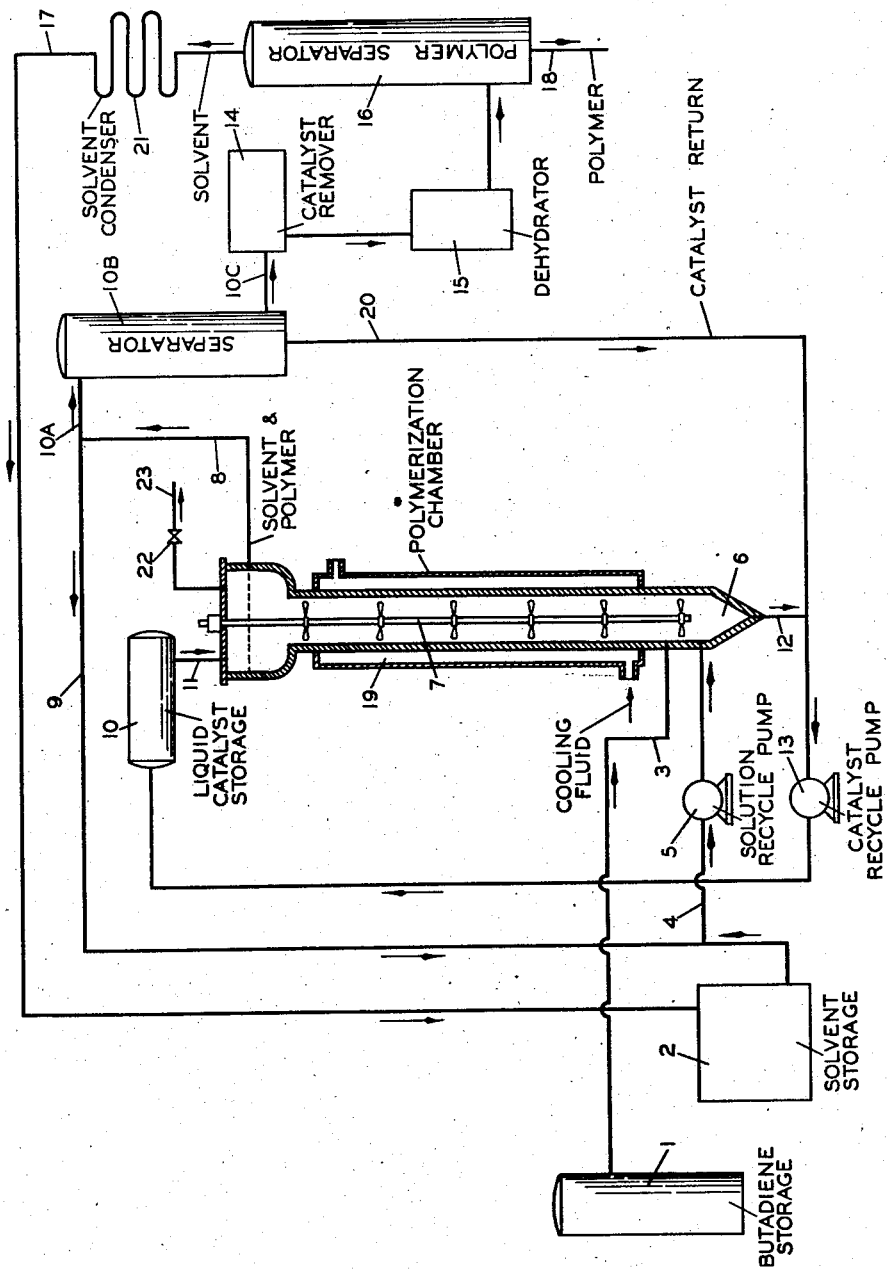

2,376,090

UNITED STATES PATENT OFFICE 2,376,090

PROCESS FOR POLYMERIZATION OF DIOLEFINS

Walter A. Schulze and William N. Axe, Bartlesville, Okla., assignors to Phillips Petroleum Company, a corporation of Delaware Application January 24, 1942, Serial No. 428,123

12 Claims. (Cl. 260—93)

The present invention relates to a new process for the production of polymers of high molecular weight from butadiene and like aliphatic conjugated diolefins. More particularly it relates to the preparation of plastic, oily and rubber-like synthetic products through the catalytic polymerization of butadiene or the like.

This invention has as one object the provision of a new and improved process for the manufacture of polymers of aliphatic conjugated diolefins such as butadiene. A further object is the disclosure of reaction conditions including temperature, pressure and concentration of polymerizable diolefin which result in the production of useful polymers. Still another object is to provide an improved manipulative procedure for carrying out the polymerization. Numerous other objects will appear from the following description taken in conjunction with the accompanying drawing which portrays diagrammatically, with the reaction chamber in section, one form of apparatus which has been found particularly suitable for carrying out the process of the present invention in a continuous manner.

We have discovered that the polymerization of diolefins of the butadiene type can be accomplished at moderate temperatures and pressures in the presence of selected organic complex or addition compounds of boron fluoride and aliphatic acids. The nature of the catalyst and the products together with the general procedure for carrying out the polymerization reactions result in a process for the production of diolefin polymers, which is substantially different from any process heretofore described.

The polymerization catalysts used in accordance with this invention comprise the liquid complex compounds formed in reactions of boron fluoride with aliphatic monocarboxylic acids. With simple acids of this class, containing from 1 to 5 or more carbon atoms, two series of addition compounds are probably formed during the reaction with boron fluoride. These compounds are tentatively classified by the following type formulas, although other formulas may exist:

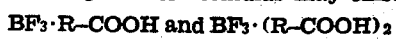

in which R is hydrogen or an alkyl group. Although essentially pure compounds of each series can apparently be prepared, in actual practice the liquid acids when saturated with boron fluoride appear to take up from 0.5 to 1 mol of boron fluoride per mol of acid. Accordingly the liquid catalyst used in accordance with the present invention is formed by the combination of from about one-half to about 1 mol of boron fluoride with one mol of acid. The liquid addition compounds formed are stable at moderate temperatures and under the conditions of the present process.

In accordance with the present invention, an aliphatic conjugated diolefin of the butadiene type (i. e. butadiene or its homologues such as for example isoprene, piperylenes, 2, 3-dimethylbutadiene, etc, or substitution products of butadiene or its homologues), and preferably butadiene itself, is polymerized by means of a polymerization catalyst consisting of a liquid addition compound of boron fluoride and an aliphatic saturated unsubstituted monocarboxylic, i.e. a fatty, acid of from 1 to 5 carbon atoms, at a temperature ranging from about 30° F. to about 120° F., and preferably from about 30° F. to about 100° F., at substantially atmospheric pressure, and in the presence of a large volume of an inert diluent. The diluent is preferably a solvent for both the diolefin and for at least the lower liquid polymers thereof, and is preferably immiscible with the catalyst.

Immiscibility of the diluent or solvent with the liquid catalyst is advantageous because it permits ready separation, after reaction, of catalyst from diluent or solvent containing polymer, the separation taking place either in a separating zone apart from the reaction zone or in the said reaction zone itself. This separation may conveniently be effected by allowing layer formation under the influence of gravity or by centrifuging, the liquid catalyst being the heavier. The advantage of this ease of separation due to immiscibility outweighs the advantage of possibly more intimate contact which would be obtained were the diluent a mutual solvent for both the catalyst and the diolefin. Sufficiently intimate contact for rapid polymerization may be readily and economically obtained by agitating vigorously the two immiscible phases in any suitable manner as for example by stirring, by passing through a centrifugal mixing pump, or other contacting device.

Another important feature of our invention is that the concentration of unreacted butadiene, or other diolefin, throughout the reaction zone and period is maintained at a low figure; namely below about 10 volume percent of the solution phase, and preferably below about 2 volume percent down to say about 1 volume per cent, or even lower. This may be effected by using a sufficient volume of inert diluent or solvent, and/or by introducing the fresh butadiene into the reaction zone at a sufficiently low rate and maintaining sufficiently rapid conditions of reaction, that at the rate of introduction of the butadiene, the above limits are not exceeded. Preferably both of these precautionary measures are used.

In a preferred mode of operation, which is continuous, two endless flowing circuits of the immiscible liquids are established, these circuits overlapping in a portion to form the polymerization zone in which the liquids flow countercurrently and are very intimately contacted. One of these liquids consists of the liquid catalyst and the other consists of the inert diluent or solvent in which is dissolved the butadiene or the soluble polymers thereof and in which is suspended any insoluble polymer. The reaction zone is preferably sufficiently long, and there is preferably sufficiently intimate and extended contact therein, that the solvent or diluent issuing therefrom contains substantially no unreacted butadiene but only the dissolved and/or suspended polymers thereof. In addition conditions are maintained such that the concentration of unreacted butadiene at no point in the reaction zone attains the limits set forth above. In practice, if the concentration of butadiene is kept below these limits at the beginning of the reaction zone, it will necessarily be below these limits in the rest of the reaction zone.

Preferably the oppositely travelling immiscible liquids are vigorously agitated throughout the major portion of the reaction zone for intimate contact and rapid reaction. Settling zones, in which there is little or no agitation and therefore quiescent opportunity for layer separation, may be provided at both ends of the reaction zone. Under some circumstances the reaction zone may be packed with suitable packing material designed to give intimate contact.

Preferably the reaction zone takes the form of a vertical column equipped with a vertical agitator intermediate its ends and in which catalyst descends and diluent and diolefin ascend in countercurrent relationship. The catalyst is removed at the bottom and returned to the top while the solution and/or suspension of polymer is removed at the top. Any suspended polymer may be removed and the solution or diluent returned to the bottom of the column. Equilibrium is soon established at the desired efficient and economical concentration of polymer in the diluent, whereupon a portion of the solution is withdrawn from the polymer solution circuit and treated in any suitable manner to separately recover the polymer and solvent or diluent therefrom. If desired, though less preferably, the entire diluent or solvent, containing the polymer in solution and/or suspension, leaving the top of the reaction column may be treated to recover all of the polymer therein and the so recovered polymer-free solvent or diluent recycled to the bottom of the column.

The diolefin may be introduced directly into the bottom of the column at a suitable rate in gaseous or liquid form, preferably the former in the case of butadiene, or in the form of a solution in either fresh or recycled solvent. Such a solution may be formed just prior to its point of entry into the bottom of the column.

While it is difficult to fix precise limits for the relative proportions of catalyst, diluent, diolefin and polymer in the reaction zone, the discussion herein will enable those skilled in the art to readily practice the invention without such explicit limits, since the fixing of the other essential operating conditions in the manner disclosed herein will automatically determine correct relative proportions. However it may be stated that in batch operation the amount of inert solvent or diluent may be as high as about 50 times by weight that of the catalyst. However more catalyst than this may be employed. In a continuous process the amount of catalyst may range as high as an amount equal to that of the diluent.

When polymerizing butadiene in accordance with the present invention, we prefer to use a temperature ranging from about 30° to about 120° F. or substantially atmospheric temperature. Temperatures of from about 80° to about 100° F. are in many cases preferred. As the temperature approaches about 120° F., less desirable polymers are obtained. Above 120° F. and especially above 130° F. the products from butadiene are still less desirable for the purpose at hand.

When polymerizing homologues of butadiene, materially different temperatures, than for butadiene, may be found preferable.

While the invention is generally applied to butadiene, which is normally gaseous, it may be applied to homologues thereof, which are normally liquid, such as isoprene, piperylenes, 2,3-dimethylbutadiene, 2-chloro-butadiene, etc. In such case the diolefin may be introduced to the reaction zone either as such, in the liquid or gaseous form, or in the form of a previously prepared solution in the solvent or diluent employed.

The production of valuable polymers from butadiene or the like is carried out in the preferred embodiment of our invention by bringing together in a suitable liquid paraffin hydrocarbon reaction medium and/or diluent, the aliphatic acid-boron fluoride catalyst, and relatively small and closely controlled amounts of butadiene either as the substantially pure compound or in the form of hydrocarbon mixtures containing a major proportion of the diolefin. The polymers formed may be wholly or partially soluble in the paraffin hydrocarbon medium. Additional amounts of butadiene are constantly added as the polymerization proceeds to maintain optimum concentrations, and the polymer products are eventually separated by suitable means from the catalyst and the hydrocarbon solvent and/or diluent.

The preferred solvents and/or diluents for the process are the low-boiling paraffin hydrocarbons, preferably those which are normally liquid having from four to eight atoms or even more, such as pentanes, hexanes and the like, which are substantially inert under the polymerizing conditions and which are easily separable from the catalyst and the products of polymerization. These hydrocarbons may be used as the pure compounds or as more or less closely fractionated cuts from natural gasoline, or other available paraffinic hydrocarbon mixtures. Pentane is preferred.

In the operation of our process we have found that it is exceedingly important that the concentration of butadiene or other diolefin in the polymerization zone be maintained at a low level in order to facilitate control of the reaction conditions and the nature of the resultant products. Thus, we prefer to maintain the volume ratio of butadiene to hydrocarbon diluent or solvent below 1:10 at all times, and best results are often obtained with butadiene concentrations in the polymerization zone not exceeding 1 to 2 volume per cent of the solvent or diluent phase.

Polymerization of butadiene with the catalyst described may be carried out at atmospheric temperatures in accordance with this invention. Thus, satisfactory products may be obtained at temperatures in the range of about 30 to about 100° F. Still higher temperatures up to about 120° F. may be employed with the higher-boiling hydrocarbon diluents, but at temperatures above 120° F. the products are of a less desirable nature and reaction control is difficult.

With these temperatures, pressures in the process are usually substantially atmospheric. Special provisions for maintaining atmospheric pressures are ordinarily unnecessary when the solvent or diluent is properly chosen and polymerization temperatures are closely controlled.

We have noted that under the above-described reaction conditions the action of our aliphatic monocarboxylic acid-boron fluoride catalyst is entirely different from that observed for boron fluoride alone. Our preferred catalysts are not only much more active in promoting the polymerization of diolefins of the butadiene type under these conditions, but also produce polymers of different and much more desirable characteristics.

Examples of suitable aliphatic saturated monocarboxylic acids which may be used are: formic, acetic, propionic, butyric, and valeric. In general acetic acid is preferred. Higher fatty acids which form, with boron fluoride, addition compounds which are solid within the above temperature range are less desirable for liquid phase contacting although they may be employed in certain instances in suspension in the reaction mixture.

Referring to the accompanying drawing, 1 represents a storage tank containing a liquid hydrocarbon mixture containing a major proportion of butadiene from which said mixture is withdrawn in gaseous form via line 3 and passed into the bottom of reaction chamber 6. A suitable hydrocarbon solvent and/or diluent is stored in tank 2 from which it is pumped by pump 5 through line 4 into reaction chamber 6. The reaction chamber 6 is operated with the liquid level maintained at the height of withdrawal to line 8. During operation, liquid catalyst (as described above) is withdrawn from storage tank 10 via line 11 and introduced into the top of 6 where it passes downwardly through the ascending stream of the solution of butadiene and polymer in the paraffin hydrocarbon solvent. Intimate contact between the catalyst and the hydrocarbon liquid is maintained by the stirring shaft 7 or its equivalent. Catalyst is removed at the bottom via line 12 and recycled by pump 13 to tank 10. Solvent containing the polymerized butadiene is removed continuously via line 8 and recycled by means of line 9 and pump 5. After a predetermined viscosity of the polymer solution and/or suspension has been attained, the product is partially diverted via line 10A into a separator 10B while the remainder is recycled with added make-up solvent added from 2. Entrained catalyst is separated by gravity in 10B and returned to the catalyst recycle pump 13 via line 20. The supernatant layer of polymer solution passes from separating zone 10B via line 10C to zone 14 where last traces of catalyst are removed from the product stream by means of a dilute alkaline solution. The alkali-washed product is then dehydrated in 15 and the dry product fed into polymer separator 16 where the solvent is removed by distillation. The vapors go overhead via line 17 into condenser 21 where they are condensed to liquid form, and thence to solvent storage 2. The finished polymer is withdrawn through line 18.

Heat of polymerization is removed by means of a suitable cooling fluid circulated through cooling jacket 19. A vent line 23 is provided with an automatic pressure release valve 22 in order to maintain substantially atmospheric pressure within the polymerization zone.

Where batch operation is employed, a preferred method of contacting involves the suspension of the liquid catalyst in the diluent in a finely divided state, as by vigorous agitation. Butadiene, ordinarily in the gaseous state, is introduced beneath the liquid surface at such rate that it all reacts in the reaction zone and that at no point therein are the above limits of unreacted diolefin concentration exceeded and while maintaining reaction conditions such that the butadiene is intimately dispersed in finely divided form immediately upon its introduction. This gradual addition is continued until a product of the desired characteristics has been produced. The addition of butadiene is so regulated that substantially complete reaction thereof takes place. Temperature control may be by means of internal cooling coils. Batch operation may be advantageous where polymers of very high molecular weight are to be formed. Such polymers are not soluble in the preferred aliphatic paraffin hydrocarbon diluent and/or solvent.

The amount of the catalyst employed will depend on the total volume of the hydrocarbon polymerization medium and the efficiency of the means for suspending or dispersing the catalyst throughout the hydrocarbon liquid. It is desirable to have complete and uniform dispersion of catalyst in more or less finely divided form to promote smooth polymerization. This effect may be attained with as little as about one per cent by volume of catalyst in the reaction liquid although much higher concentrations may be used if desired, particularly in a continuous type polymerization wherein the catalyst is recycled after separation from the hydrocarbon phase.

Further details relating to the procedure and the advantages of this invention will be described in the following examples which are merely offered by way of illustration and without limiting the invention.

*Example 1*

Commercial butadiene of 94 per cent purity was passed into a suspension of 2 cc. of boron fluoride-acetic acid addition compound in 250 cc. of n-pentane with mechanical agitation. The flow rate of gaseous butadiene was maintained at 90 cc. per minute and the reaction temperature was controlled between 48 and 55° F. Substantially complete reaction of butadiene took place during the active life of the catalyst to produce 70 g. of pentane-insoluble polymer and 10 g. of pentane-soluble product. Entrained catalyst was removed from the insoluble polymer with dilute sodium hydroxide to give a non-sticky, tough, white material, which was insoluble in non-aromatic hydrocarbons and which softened and swelled in aromatic hydrocarbons. The pentane-soluble portion of the reaction product was recovered as a clear, colorless, viscous oil by washing the original pentane solution with dilute alkali and subsequently removing the solvent by distillation.

*Example 2*

Commercial butadiene of 94 per cent purity was passed into a suspension of 2 cc. of boron fluoride-acetic acid addition compound in 250 cc.

of n-pentane during mechanical agitation. The flow rate of gaseous butadiene was maintained at 85 cc. per minute and the reaction temperature was maintained between 75–80° F. Due to the formation of gummy polymer, the life of the catalyst was diminished by mechanical occlusion. The product consisted of approximately 50 g. of pentane-insoluble and 10 g. of pentane-soluble polymer. The products were recovered as in Example 1. The insoluble polymer was a pale yellow, soft, resilient material which was insoluble in non-aromatic hydrocarbons, but which softened and swelled in aromatic hydrocarbons. The pentane-soluble portion was recovered as a clear viscous oil.

*Example 3*

A catalyst was prepared by saturating technical butyric acid with boron fluoride while maintaining the reaction temperature between 80–100° F. Approximately 0.7 mol of boron fluoride was absorbed per mol of acid.

Commercial butadiene of at least 90 per cent purity was passed into a suspension of 5 cc. of the boron fluoride-butyric acid catalyst in 250 cc. of n-pentane during mechanical agitation. The butadiene flow rate was maintained at 85 cc. per minute and the temperature of reaction was held at 75–85° F. At the conclusion of the reaction 13 g. of pentane-soluble and 45 g. of insoluble polymeric material was recovered in the manner previously described. The insoluble polymer was a tough, dough-like mass, while the soluble polymer was a colorless viscous oil.

The choice of the inert hydrocarbon diluent will vary with the boiling point of the diolefin being polymerized and the nature of the polymers. Therefore all diluents described are not equally satisfactory for each diolefin. It will be understood that the various aliphatic conjugated diolefins are by no means equivalents in all aspects of the present invention. Experience in synthetic rubber production has emphasized the differences in behavior of butadiene and the higher diolefins in polymerization and in the products obtained. Thus, the proportion of the butadiene polymer soluble in the reaction diluent may be controlled by the herein described reaction controls including temperature. Temperatures for controlling the ratio of soluble to insoluble polymers of $C_5$ and higher aliphatic conjugated diolefins may be materially different.

It is to be understood that the invention is not limited to the specific examples which have been offered merely as illustrations and that the modifications may be made within the scope of the appended claims without departing from the spirit of the invention.

We claim:

1. A process for the polymerization of an aliphatic conjugated diolefin which comprises contacting said diolefin with an addition compound of boron fluoride and an aliphatic monocarboxylic acid in the presence of a large volume of a paraffin hydrocarbon as an inert diluent, and maintaining the concentration of unreacted diolefin in the reaction zone at less than about 10 volume per cent of the diluent phase throughout the reaction.

2. A process for the polymerization of an aliphatic conjugated diolefin which comprises contacting said diolefin with an addition compound of boron fluoride and an aliphatic monocarboxylic acid in the presence of a large volume of a paraffin hydrocarbon as an inert diluent, and maintaining the concentration of unreacted diolefin in the reaction zone at less than about 2 volume per cent of the diluent phase throughout the reaction.

3. A process for the polymerization of an aliphatic conjugated diolefin which comprises contacting said diolefin with an addition compound of boron fluoride and an aliphatic monocarboxylic acid in the presence of a large volume of an inert diluent which is selected from the group consisting of paraffin hydrocarbons of from four to eight carbon atoms.

4. A process for the polymerization of butadiene which comprises contacting same with an addition compound of boron fluoride and an aliphatic monocarboxylic acid in the presence of a large volume of an inert diluent which is pentane.

5. The process of polymerizing an aliphatic conjugated diolefin which comprises establishing in a reaction zone oppositely flowing intimately contacting streams of a liquid addition compound of boron fluoride and an aliphatic monocarboxylic acid on the one hand and a solution of said diolefin in a paraffin hydrocarbon as an inert diluent on the other hand, and maintaining the concentration of unreacted diolefin in the reaction zone at less than 10 volume per cent of the diluent phase throughout the reaction.

6. The continuous process of polymerizing an aliphatic conjugated diolefin which comprises establishing two endless flowing circuits of a liquid addition compound of boron fluoride and an aliphatic monocarboxylic acid on the one hand and a solution of said diolefin in a paraffin hydrocarbon as an inert solvent on the other hand, said circuits overlapping to form a polymerization zone in which the flow is countercurrent, and in which said compound is descending and said solution ascending, continuously introducing unreacted diolefin to the bottom of said zone, continuously withdrawing a portion of the solvent stream issuing from the top of said zone, and recovering polymer therefrom.

7. The process of polymerizing butadiene which comprises flowing a solution thereof in a large volume of an inert paraffinic solvent upwardly in a polymerization column, flowing a liquid catalyst consisting essentially of an addition product of boron fluoride and an aliphatic monocarboxylic acid downwardly in said column, vigorously agitating the material in said column to promote intimate contact and rapid reaction, separating catalyst at the bottom of said column and recycling to the top thereof, withdrawing solvent phase from the top of said column and recycling a portion of said solvent phase to the bottom of said column, introducing fresh unreacted butadiene to the bottom of said column, introducing solvent to the bottom of said column, withdrawing the balance of said withdrawn solvent phase from the system at a rate equivalent to that at which said fresh butadiene is introduced, recovering butadiene polymer from said balance of said solvent phase, maintaining the temperature in said column between about 30° F. and about 120° F. and the pressure at substantially atmospheric, and maintaining the concentration of unreacted butadiene throughout the reaction zone at below about 10 volume per cent of the solvent phase.

8. A process for the polymerization of butadiene which comprises contacting same in the presence of a major proportion of a substantially inert paraffin hydrocarbon diluent with a polymerization catalyst consisting of a liquid addition compound of boron fluoride and an aliphatic monocarboxylic acid, while maintaining the reaction temperature between about 30° and about 120° F. at substantially atmospheric pressure, and maintaining the butadiene concentration below about 10 volume per cent of the hydrocarbon diluent phase.

9. A process for the simultaneous production of hydrocarbon soluble and insoluble polymers from butadiene which comprises contacting butadiene in the presence of sufficient paraffinic hydrocarbon diluent to produce butadiene concentrations not substantially exceeding two volume per cent, at temperatures in the range of from about 45 to about 85° F. with a catalyst consisting of a liquid addition compound of boron fluoride and an aliphatic monocarboxylic acid of one to five carbon atoms.

10. A process for the polymerization of butadiene which comprises contacting same at a temperature of from 80° to 100° F. and at substantially atmospheric pressure with a polymerization catalyst consisting of a liquid addition compound of boron fluoride and an aliphatic monocarboxylic acid of one to five carbon atoms and containing from about 0.5 to about 1 mol of boron fluoride per mol of acid in the presence of a large volume of a paraffin hydrocarbon diluent, and maintaining the concentration of unreacted butadiene in the reaction zone at less than 10 volume per cent of the diluent phase throughout the reaction.

11. A process for the production of polymers of high molecular weight from butadiene which comprises introducing butadiene into an agitated suspension of a liquid addition compound of boron fluoride and an aliphatic monocarboxylic acid in a paraffinic hydrocarbon liquid as an inert diluent, maintaining said suspension at temperatures in the range of about 30° to about 120° F., and so controlling the rate of addition of butadiene so that the concentration of unreacted butadiene in the reaction zone is less than 10 volume per cent of the diluent phase throughout the reaction whereby substantially complete polymerization of said butadiene occurs.

12. A process for the polymerization of butadiene which comprises contacting said butadiene with an addition compound of boron fluoride and acetic acid containing about 0.5 to 1 mol of boron fluoride per mol of acid in the presence of a large volume of pentane as a diluent, and maintaining the concentration of unreacted butadiene in the reaction zone at less than 10 volume per cent of the diluent phase throughout the reaction.

WALTER A. SCHULZE.
WILLIAM N. AXE.